United States Patent
Paiva et al.

(10) Patent No.: US 7,952,688 B2
(45) Date of Patent: May 31, 2011

(54) MULTI-WAVEBAND SENSOR SYSTEM AND METHODS FOR SEEKING TARGETS

(75) Inventors: Richard A. Paiva, Tucson, AZ (US);
David Michika, Tucson, AZ (US);
Justin C. Jenia, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 328 days.

(21) Appl. No.: 12/136,396

(22) Filed: Jun. 10, 2008

(65) Prior Publication Data

US 2009/0303456 A1    Dec. 10, 2009

(51) Int. Cl.
*G01C 3/08* (2006.01)
(52) U.S. Cl. ............... 356/4.01; 356/5.01; 356/5.15
(58) Field of Classification Search .......... 356/4.01, 356/5.01, 5.15
See application file for complete search history.

(56) References Cited

U.S. PATENT DOCUMENTS

| | | |
|---|---|---|
| 5,054,917 A | 10/1991 | Pepin et al. |
| 5,093,574 A | 3/1992 | Pratt et al. |
| 5,149,956 A | 9/1992 | Norton |
| 6,166,803 A | 12/2000 | Milton et al. |
| 6,952,010 B2 | 10/2005 | Nizani |
| 6,969,840 B1 | 11/2005 | Theriault |
| 7,545,562 B2 * | 6/2009 | Chen et al. ............ 359/399 |
| 7,569,824 B2 * | 8/2009 | Gidseg et al. ............ 250/348 |
| 2003/0174315 A1 | 9/2003 | Byren et al. |
| 2004/0021852 A1 | 2/2004 | DeFlumere |
| 2004/0179575 A1 | 9/2004 | Markham |

FOREIGN PATENT DOCUMENTS

WO    WO-2004021852 A1    2/2004

OTHER PUBLICATIONS

"International Application Serial No. PCT/US2009/003496, Search Report mailed Aug. 10, 2009", 15 pgs.
"International Application Serial No. PCT/US2009/003496, Written Opinion mailed Aug. 10, 2009", 15 pgs.

* cited by examiner

*Primary Examiner* — Isam Alsomiri
(74) *Attorney, Agent, or Firm* — Schwegman, Lundberg & Woessner, P.A.; Gregory J. Gorrie

(57) ABSTRACT

Embodiments of a multi-waveband sensor system and method for seeking targets are generally described herein. In some embodiments, the multi-waveband sensor system includes a secondary reflector positioned within a gathering path of a primary reflector to reflect the wavebands gathered by the primary reflector back through an aperture in the primary reflector. The multi-waveband sensor system may also include a laser waveband dichroic beam splitter positioned within a focal path of the secondary reflector to pass infrared (IR) wavebands and to reflect laser wavebands. A LADAR subsystem may transmit laser wavebands for reflection by the laser waveband dichroic beam splitter through the aperture to the secondary reflector for reflection to an off-axis region on the primary reflector for direction toward a target.

22 Claims, 4 Drawing Sheets

MULTI-WAVEBAND SENSOR SYSTEM AND METHODS FOR SEEKING TARGETS

TECHNICAL FIELD

Some embodiments pertain to multi-spectral electro-optical sensors that include LAser Detection And Ranging (LADAR) systems. Some embodiments pertain to multi-waveband sensor systems and methods for seeking targets. Some embodiments pertain to missile (e.g., ICBM) interceptors and the detection and discrimination of ballistic missiles.

BACKGROUND

Conventional multi-spectral electro-optical sensors that include a LADAR system generally use separate apertures for the LADAR system. For example, a separate transmit aperture may be used for the LADAR system, or a separate receive aperture may be used for the LADAR system. As a result, these conventional sensor systems tend to be less compact and less lightweight making them less suitable for applications requiring compact and lightweight sensor systems. As threats, such as ballistic missile threats, continue to evolve in complexity and performance, so does the need for multi-spectral sensor systems to detect and discriminate these threats.

Thus, there are general needs for compact and lightweight multi-spectral electro-optical sensors. There are also needs for compact and lightweight multi-spectral sensor systems suitable for use on space-based sensors and interceptors. There are also needs for compact and lightweight multi-spectral sensor systems to detect and discriminate ballistic missile threats.

DETAILED DESCRIPTION

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments set forth in the claims encompass all available equivalents of those claims.

Figure 1:
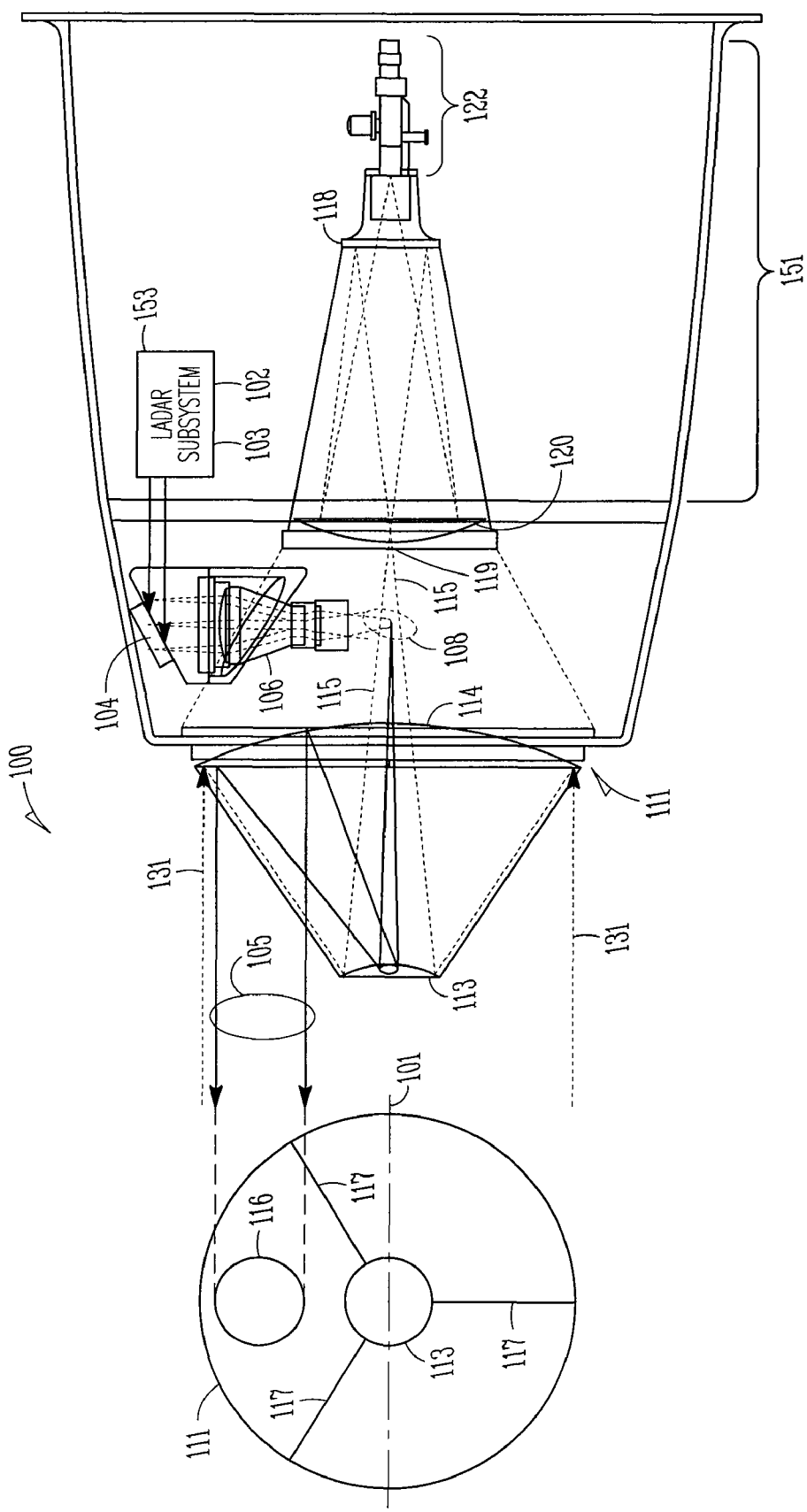
FIG. 1 illustrates a multi-waveband sensor system in accordance with some embodiments.

FIG. 1 illustrates a multi-waveband sensor system in accordance with some embodiments. Multi-waveband sensor system 100 includes infrared (IR) waveband receiver 151 to detect IR wavebands, and LAser Detection And Ranging (LADAR) subsystem 153 to transmit and receive LADAR pulses within a laser waveband. Multi-waveband sensor system 100 includes primary reflector 111 configured to gather a plurality of wavebands 131, and secondary reflector 113 positioned within a gathering path of primary reflector 111 to reflect the wavebands gathered by the primary reflector 111 back through aperture 114 at or near the center of in primary reflector 111. Multi-waveband sensor system 100 also includes laser waveband dichroic beam splitter 108 positioned within focal path 115 of secondary reflector 113 to pass IR wavebands and to reflect laser wavebands. LADAR subsystem 153 is configured to transmit LADAR pulses 105 for reflection by laser waveband dichroic beam splitter 108 through aperture 114 to secondary reflector 113 for reflection to off-axis region 116 on primary reflector 111 for direction toward a target.

In the embodiments illustrated in FIG. 1, laser waveband dichroic beam splitter 108 may be positioned at an angle within focal path 115 of secondary reflector 113 behind aperture 114. Off-axis region 116 on primary reflector 111 is selected to be devoid of strut obscurations 117 and obscuration by secondary reflector 113. Laser waveband dichroic beam splitter 108 may reflect transmitted LADAR pulses through aperture 114 to an off-center spot on secondary reflector 113 for reflection to off-axis region 116 on primary reflector 111.

In these embodiments, although LADAR pulses 105 transmitted by LADAR subsystem 153 may not be exactly co-axial with line-of-sight 101 of multi-waveband sensor system 100, they are substantially parallel. LADAR pulses 105 spread due to diffraction as they travel away from primary reflector 111 and may expand sufficiently to overlap with the field-of-view and line-of-sight of the passive sensors of IR waveband receiver 151. Any slight amount that transmitted LADAR pulses 105 are off-center has a negligible effect on the performance of LADAR subsystem 153 as the entire surface of primary reflector 111 is used to gather reflected LADAR pulses.

LADAR subsystem 153 may include LADAR transmitter 102 for transmitting LADAR pulses within laser wavebands, and LADAR receiver 103 to receive and process the LADAR pulses within the laser wavebands gathered by primary reflector 111 and reflected by laser waveband dichroic beam splitter 108. LADAR subsystem 153 may also include LADAR beam steering mirror 104 to reflect the transmitted LADAR pulses to laser waveband dichroic beam splitter 108 for direction to a target. Although laser wavebands are transmitted using only a portion of primary reflector (i.e., an off-axis region 116), the entire surface of primary reflector 111 may gather the laser wavebands that are reflected from a target as laser waveband dichroic beam splitter 108 may cover the entire imaging plane of secondary reflector 113.

In some embodiments, LADAR subsystem 153 may include laser waveband focusing optics 106 to reduce a beamwidth of the LADAR pulses generated by LADAR transmitter 103 and direct the reduced beamwidth LADAR pulses to laser waveband dichroic beam splitter 108. LADAR subsystem 153 may also include a LADAR beam separation mirror, discussed in more detail below, to separate the received and transmitted LADAR pulses.

In some embodiments, LADAR subsystem 153 may be configured to measure properties of scattered laser light to find range and/or other information of a distant target using LADAR pulses. The range to a target is determined by measuring the time delay between transmission of a pulse and detection of the reflected laser signal.

IR waveband receiver 151 is configured to detect IR wavebands provided by secondary reflector 113. IR waveband receiver 151 may include IR waveband focal plane array (FPA) assembly 122 comprising one or more IR waveband FPAs to detect selected IR wavebands. IR waveband receiver 151 may include tertiary reflector 118 to reflect the IR wavebands passed by laser waveband dichroic beam splitter 108, and quaternary reflector 120 to receive the IR wavebands reflected by tertiary reflector 118. Quaternary reflector 120 may also focus IR wavebands onto the IR waveband FPAs of IR waveband FPA assembly 122. Quaternary reflector 120 may include aperture 119 to allow passage of the IR wavebands reflected by secondary reflector 113 and passed by laser waveband dichroic beam splitter 108. Aperture 119 of quaternary reflector 120 is at or near a focus image plane of secondary reflector 113 allowing aperture 119 to be very small.

As illustrated in FIG. 1, primary reflector 111 may have a concave reflective surface, secondary reflector 113 may have a convex reflective surface, tertiary reflector 118 may have a convex reflective surface, and quaternary reflector 120 may have a concave reflective surface. In these embodiments, the reflectors may have spherical or parabolic surfaces, although the scope of the embodiments is not limited in this respect. In some embodiments, tertiary reflector 118 may have a flat reflective surface, while in other embodiments, tertiary reflector 118 may have a concave reflective surface. In some embodiments, these reflective surfaces may have broad waveband reflective coatings.

Figure 2:
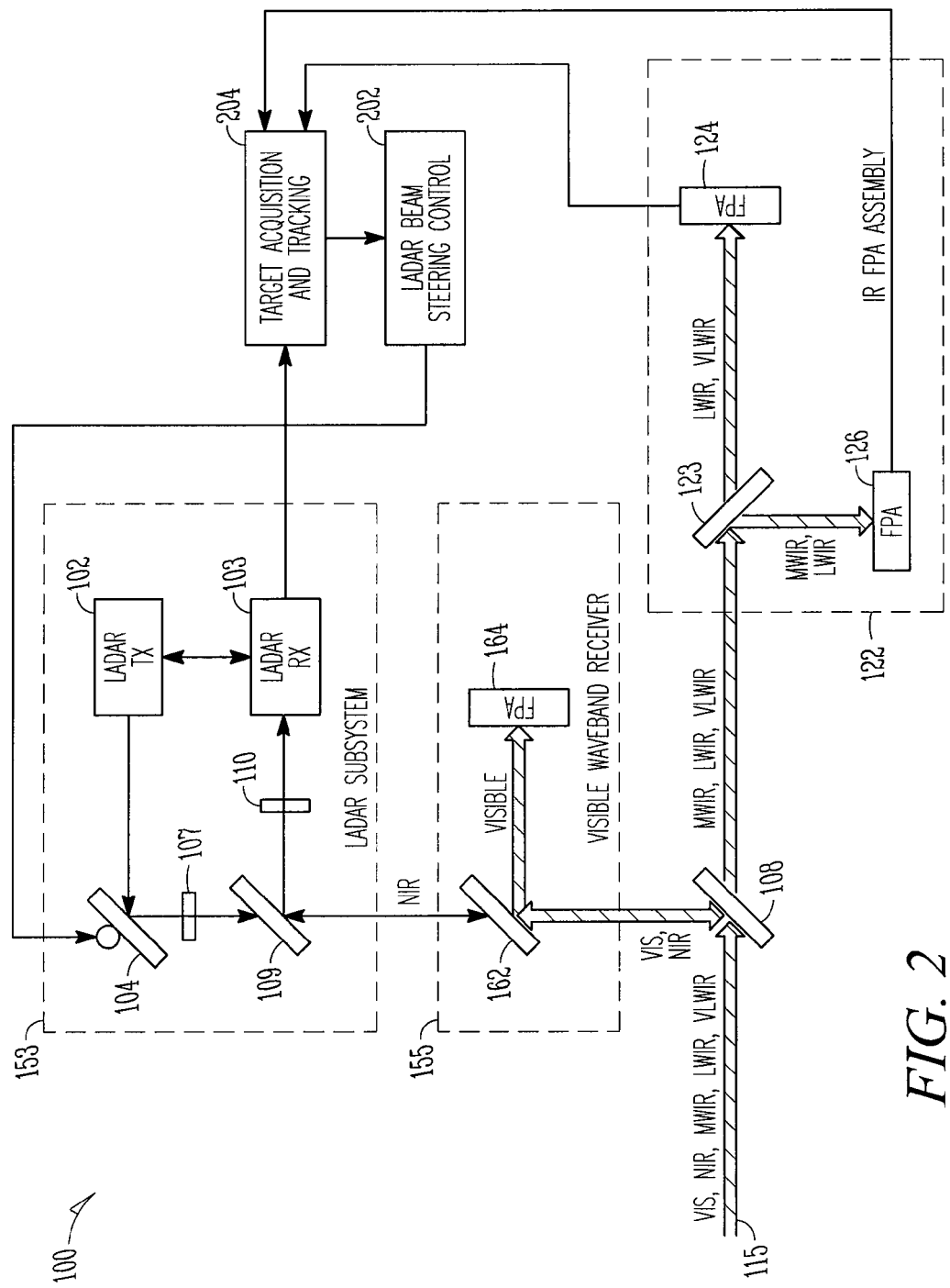
FIG. 2 is a functional diagram of the multi-waveband sensor system of FIG. 1 accordance with some embodiments.

FIG. 2 is a functional diagram of the multi-waveband sensor system of FIG. 1 accordance with some embodiments. For clarity of understanding reflectors 111, 113, 118 and 120 are not illustrated in FIG. 2. In these embodiments, multi-waveband sensor system 100 may also include visible waveband receiver 155 to process visible wavebands gathered by primary reflector 111 (FIG. 1). Visible waveband receiver 155 may be included when multi-waveband sensor system 100 is configured to detect and process visible wavebands.

As illustrated in FIG. 2, wavebands are received along focal path 115 from secondary reflector 113 (not illustrated) and are incident on laser waveband dichroic beam splitter 108, which may separate IR wavebands from visible wavebands and laser wavebands (e.g., Near-IR wavebands). The IR wavebands that pass through laser waveband dichroic beam splitter 108 are provided to IR waveband FPA assembly 122. The laser wavebands that are reflected by laser waveband dichroic beam splitter 108 are provided to LADAR subsystem 153. The visible wavebands that are reflected by laser waveband dichroic beam splitter 108 are provided to visible waveband receiver 155.

LADAR subsystem 153 includes LADAR transmitter 102, LADAR receiver 103, LADAR beam steering mirror 104, and LADAR beam separation mirror 109. LADAR beam separation mirror 109 may separate the received and transmitted LADAR pulses. LADAR beam separation mirror 109 is positioned between LADAR beam steering mirror 104 and laser waveband dichroic beam splitter 108 to reflect the received laser wavebands to LADAR receiver 103. LADAR beam separation mirror 109 may include an off-center hole or aperture to allow the transmitted LADAR pulses from LADAR transmitter 103 to pass from the opposite direction. The off-center hole or aperture in LADAR beam separation mirror 109 allows the transmitted laser pulses 105 to be provided off-center on the primary reflector. LADAR subsystem 153 may include one or more LADAR lenses 110 in the LADAR receiver path for image quality correction and focal length adjustment, and one or more LADAR lenses 107 in the LADAR transmit path for beam-size reduction, laser collimation and quality correction. LADAR lenses 107 is part of laser waveband focusing optics 106 (FIG. 1).

IR waveband FPA assembly 122 may include IR FPA 124 to detect longer-wave IR wavebands and IR FPA 126 to detect shorter-wave IR wavebands. IR waveband FPA assembly 122 may also include FPA assembly dichroic beam splitter 123 to receive the IR wavebands passed by laser waveband dichroic beam splitter 108. FPA assembly dichroic beam splitter 123 may pass the longer-wave IR wavebands to IR FPA 124 and may reflect the shorter-wave IR wavebands to IR FPA 126.

In some embodiments, IR waveband FPA assembly 122 may include a pair of two-waveband FPAs. In some embodiments, IR FPA 124 is a two waveband FPA configured to separately detect long-wave IR (LWIR) wavebands and very long-wave IR (VLWIR) wavebands. IR FPA 126 may also be a two-waveband FPA configured to separately detect medium-wavelength IR (MWIR) wavebands and LWIR wavebands. The LWIR wavebands separately detectable by IR FPA 124 may have wavelengths ranging from approximately 8 to 10 microns. The LWIR wavebands separately detectable by IR FPA 126 may have wavelengths ranging from approximately 6.4-6.8 microns within an atmospheric $H_2O$ absorption band. This may allow target hardbody temperature detection with reduced Earth background clutter effects. The VLWIR wavebands separately detectable by IR FPA 124 may have wavelengths of twelve or more microns. The MWIR wavebands separately detectable by IR FPA 126 may have wavelengths ranging from approximately 4.2 to 4.4 microns within an atmospheric $CO_2$ absorption band. This may allow target plume detection with reduced Earth background clutter effects.

In some embodiments, laser waveband dichroic beam splitter 108 and IR waveband FPAs 124 & 126 may be cooled to a cryogenic temperature with a cryogenic liquid or gas. The cryogenic liquid or gas may also be used to cool laser waveband dichroic beam splitter 108 to a cryogenic temperature.

Multi-waveband sensor system 100 may also include LADAR transmit beam steering control circuitry 202 configured to control LADAR beam steering mirror 104 to steer the LADAR pulses at a detected target. The LADAR pulses for transmission are reflected by laser waveband dichroic beam splitter 108 to secondary reflector 113 (FIG. 1), and are further reflected by secondary reflector 113 (FIG. 1) to off-axis region 116 (FIG. 1) on primary reflector 111 (FIG. 1) for subsequent reflection in the direction of the detected target. Multi-waveband sensor system 100 may also include target acquisition and tracking circuitry 204 to detect a target based on the output of FPAs 124 & 126 and to track the target based on the output of LADAR receiver 103. Target acquisition and tracking circuitry 204 may provide signals to LADAR transmit beam steering control circuitry 202 for controlling LADAR beam steering mirror 104, although the scope of the embodiments is not limited in this respect.

In some embodiments, when multi-waveband sensor system 100 is configured to detect and process visible wavebands, multi-waveband sensor system 100 includes visible waveband receiver 155. In these embodiments, primary reflector 111 (FIG. 1) may also gather visible wavebands. Visible waveband receiver 155 may include visible waveband FPA 164, and visible waveband dichroic beam splitter 162. Visible waveband dichroic beam splitter 162 may reflect visible wavebands gathered by primary reflector 111 and reflected by secondary reflector 113 to visible waveband FPA 164.

In some embodiments, laser waveband dichroic beam splitter 108 may reflect visible wavebands, and visible waveband dichroic beam splitter 162 is positioned within the path of the laser wavebands reflected by laser waveband dichroic beam splitter 108 as illustrated in FIG. 2. Visible band dichroic beam splitter 162 is configured to pass the laser wavebands to LADAR beam steering mirror 104 and to reflect the visible wavebands to visible waveband FPA 164.

In some alternate embodiments, laser waveband dichroic beam splitter 108 is configured to pass visible wavebands and visible band dichroic beam splitter 162 is positioned within focal path 115 of secondary reflector 113. These alternate embodiments are discussed below. In these alternate embodiments, visible waveband dichroic beam splitter 162 may also be cryogenically cooled as it is positioned within the IR path (i.e., focal path 115 of secondary reflector 113 (FIG. 1)).

Figure 3:
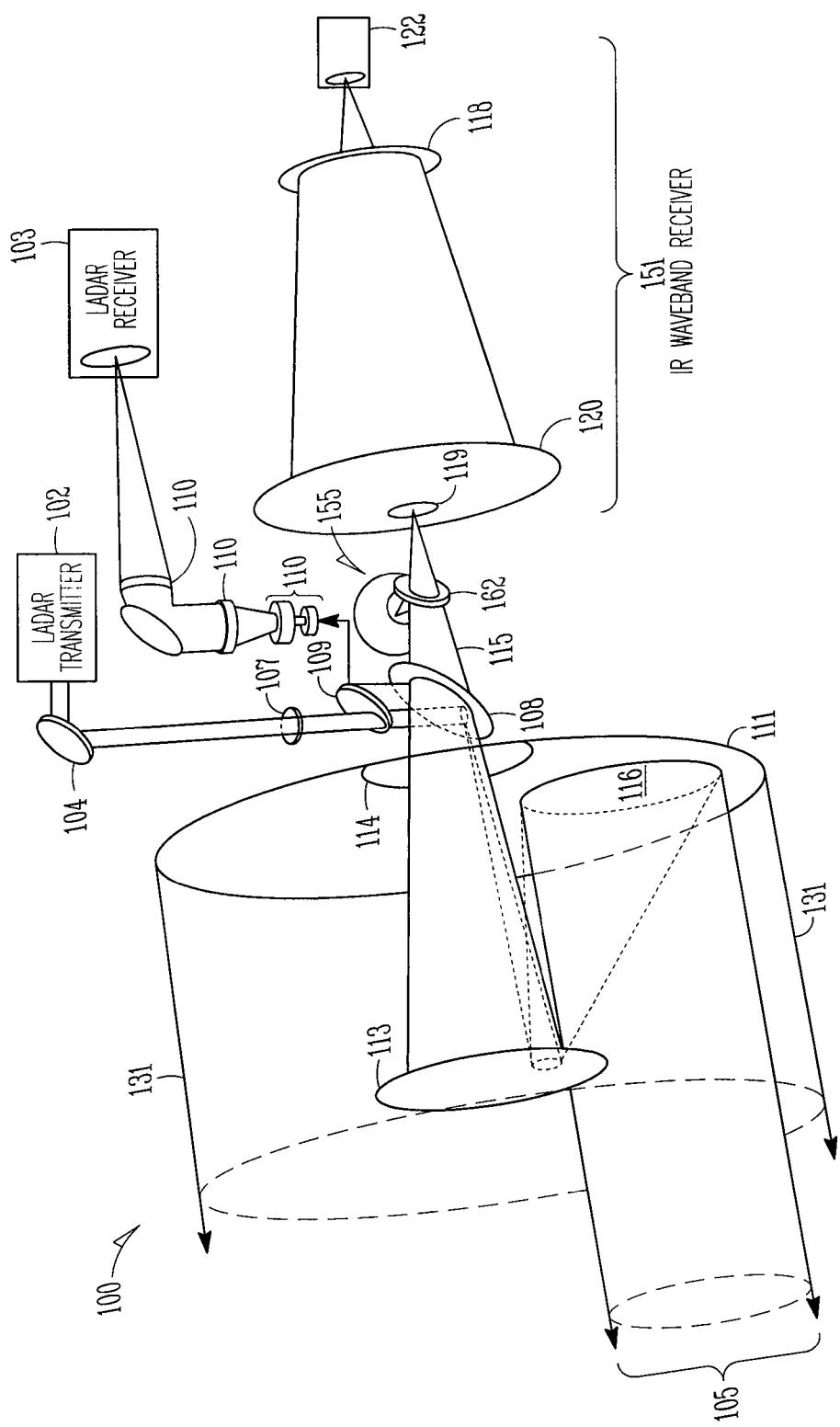
FIG. 3 is a perspective illustration of a multi-waveband sensor system in accordance with some embodiments.

FIG. 3 is a perspective illustration of a multi-waveband sensor system in accordance with some embodiments. As illustrated in FIG. 3, wavebands 131 that are to be received are gathered by primary reflector 111, and LADAR pulses 105 that are to be transmitted are reflected off off-axis region 116 (FIG. 1) on primary reflector 111 for transmission to a target.

In the alternate embodiments illustrated in FIG. 3, laser waveband dichroic beam splitter 108 is configured to pass visible wavebands and visible band dichroic beam splitter 162 is positioned within focal path 115 of secondary reflector 113. In these alternate embodiments, visible band dichroic beam splitter 162 is configured to reflect visible wavebands to visible waveband FPA 164 that were passed by the laser waveband dichroic beam splitter 108. In these alternate embodiments, visible band dichroic beam splitter 162 may pass IR wavebands to IR waveband receiver 151 and may be cryogenically cooled, although the scope of the embodiments is not limited in this respect.

Figure 4:
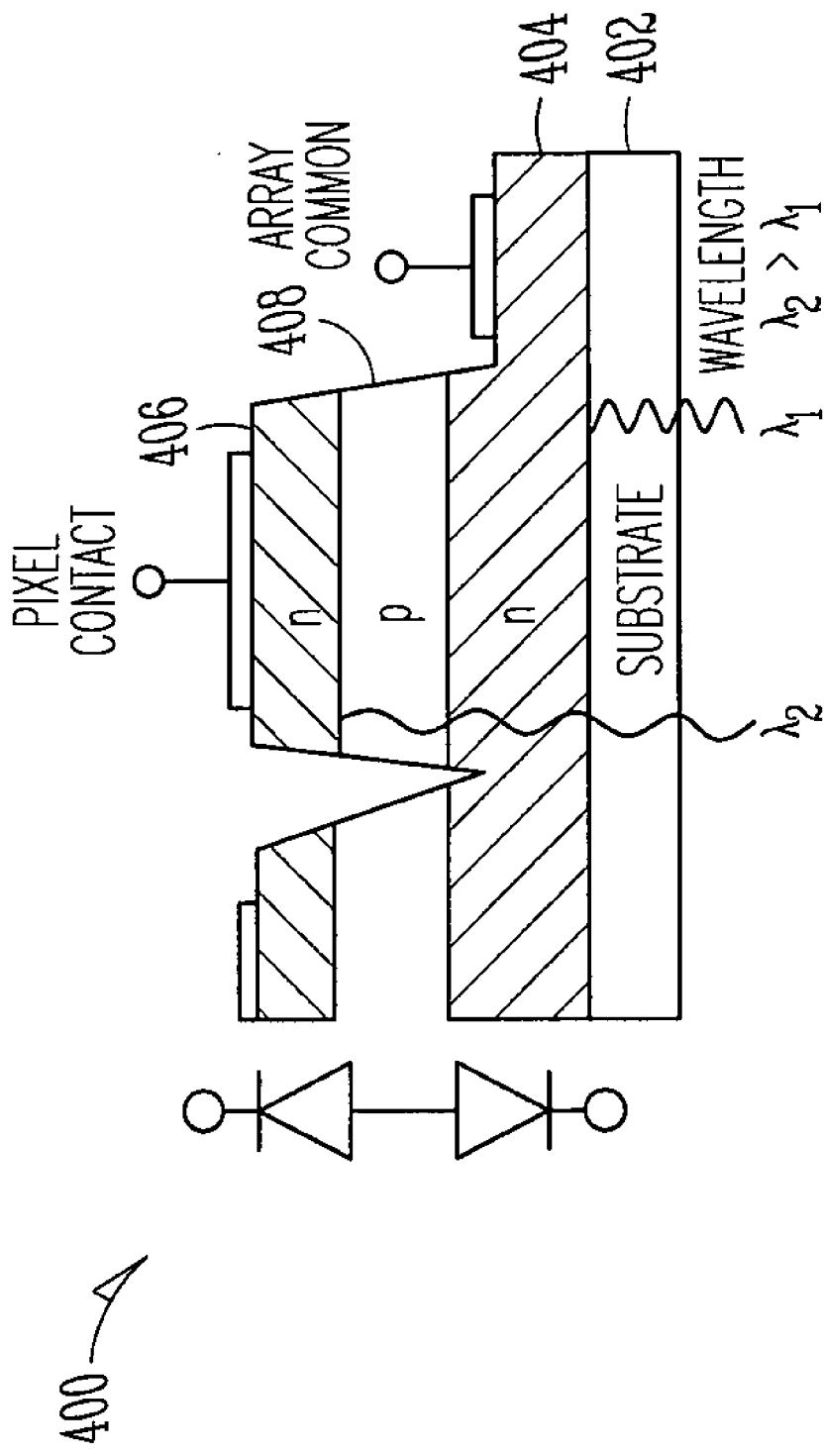
FIG. 4 illustrates a two-waveband focal plane array (FPA) suitable for use with some embodiments.

FIG. 4 illustrates a two-waveband FPA suitable for use with some embodiments. Two-waveband FPA 400 is suitable for use as either FPA 124 (FIG. 2) or FPA 126 (FIG. 2). Two-waveband FPA 400 includes substrate 402 which may pass both shorter and longer IR wavebands. Two-waveband FPA 400 also includes semiconductor material 404 disposed on substrate 402 to absorb shorter IR wavebands ($\lambda_1$) and to generate a corresponding voltage. Two-waveband FPA 400 also includes semiconductor material 406 to absorb longer IR wavebands ($\lambda_2$) and to generate a corresponding voltage. Two-waveband FPA 400 also includes semiconductor 408 disposed between semiconductor materials 404 & 406. Longer IR wavebands may pass through semiconductor material 404 and semiconductor material 408 to semiconductor material 406. In these embodiments, semiconductor materials 404 & 406 may comprise an n-doped material, and semiconductor material 408 may comprise a p-doped material. This configuration provides an N—P—N back-to-back diode configuration. In these embodiments, the shorter IR wavebands may have IR wavelengths in the range of $\lambda_1$, and the longer IR wavebands may have IR wavelengths in the range of $\lambda_2$. Two-waveband FPA 400 may be referred to as a two-color FPA. Other configurations for two-waveband FPAs may also be suitable for use as either FPA 124 (FIG. 2) or FPA 126 (FIG. 2).

As today's ballistic missile threats continue to evolve in complexity and performance so does the need for multi-waveband sensor systems to detect and discriminate these threats. Multi-waveband sensor system 100 (FIG. 1) provides for increased discrimination capabilities in a single system by provided a telescope and focal plane arrangement that allows a single sensor system to detect and track threats, such as boosting intercontinental ballistic missiles (ICBMs), as well as perform discrimination against mid-course re-entry vehicles (RVs) and decoys. Additionally the arrangement of the optical train provided by multi-waveband sensor system 100 (FIG. 1) supports multiple detectors and greatly reduces the amount of optics and telescopes required on one vehicle, thus minimizing cost and complexity. By utilizing a pair of two-waveband FPAs, a LADAR subsystem, and a laser waveband dichroic beam splitter within a single telescope, multi-waveband sensor system 100 may achieve detection of both midcourse and boost phase missions with a single common sensor system.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-waveband sensor system comprising:
   a secondary reflector positioned within a gathering path of a primary reflector to reflect the wavebands gathered by the primary reflector back through an aperture in the primary reflector;
   a laser waveband dichroic beam splitter to pass infrared (IR) wavebands and to reflect laser wavebands; and
   a LAser Detection And Ranging (LADAR) subsystem to transmit LADAR pulses within the laser wavebands and to process LADAR returns,
   wherein the laser waveband dichroic beam splitter is positioned within a focal path of the secondary reflector to:
   pass the IR wavebands reflected by the secondary reflector through to an IR waveband receiver;
   reflect the LADAR pulses through the aperture to the secondary reflector for reflection to an off-axis region on the primary reflector for direction toward a target; and
   reflect the LADAR returns to the LADAR subsystem that are gathered by the primary reflector and reflected by the secondary reflector through the aperture.

2. The sensor system of claim 1 wherein the laser waveband dichroic beam splitter is positioned within the focal path of the secondary reflector behind the aperture, and
   wherein the off-axis region on the primary reflector is devoid of strut obscurations and obscuration by the secondary reflector.

3. The sensor system of claim 2 wherein the LADAR subsystem comprises:
   a LADAR transmitter for transmitting LADAR pulses having laser wavebands;
   a LADAR receiver to receive and process the laser wavebands gathered by the primary reflector and reflected by the laser waveband dichroic beam splitter; and
   a LADAR beam steering mirror to reflect the LADAR pulses to the laser waveband dichroic beam splitter for direction to the target.

4. The sensor system of claim 3 wherein the LADAR subsystem further comprises:
   laser waveband focusing optics to reduce a beamwidth of the LADAR pulses generated by the LADAR transmitter and direct the reduced beamwidth LADAR pulses to the laser waveband dichroic beam splitter; and
   a LADAR beam separation mirror positioned between the LADAR beam steering mirror and the laser waveband dichroic beam splitter, the LADAR beam separation mirror to reflect the received laser wavebands to the LADAR receiver, the LADAR beam separation mirror including an off-center hole to allow the transmitted LADAR pulses from the LADAR transmitter to pass from the opposite direction.

5. The sensor system of claim 3 further comprising an IR waveband receiver to detect IR wavebands provided by the secondary reflector, the IR waveband receiver comprising an IR waveband focal plane array (FPA) assembly comprising one or more IR waveband FPAs to detect selected IR wavebands.

6. The sensor system of claim 5 wherein the IR waveband FPA assembly comprises:
a first IR FPA to detect longer-wave IR wavebands;
a second IR FPA to detect shorter-wave IR wavebands; and
a FPA assembly dichroic beam splitter to receive the IR wavebands passed by the laser waveband dichroic beam splitter, the FPA assembly dichroic beam splitter to pass the longer-wave IR wavebands to the first IR FPA and to reflect the shorter-wave IR wavebands to the second IR FPA.

7. The sensor system of claim 6 wherein the first IR FPA is a two-waveband FPA configured to separately detect long-wave IR (LWIR) wavebands and very long-wave IR (VLWIR) wavebands,
wherein the second IR FPA is a two-waveband FPA configured to separately detect medium-wavelength IR (MWIR) wavebands and LWIR wavebands.

8. The sensor system of claim 7 wherein the first and second IR FPAs are a two-color FPA and comprise:
a first substrate to pass shorter and longer IR wavebands;
a first semiconductor material disposed on the first substrate to absorb the shorter IR wavebands and generate a corresponding voltage; and
a second semiconductor material to absorb the longer IR wavebands and generate a corresponding voltage,
wherein the longer IR wavebands pass through the first semiconductor material to the second semiconductor material.

9. The sensor system of claim 7 wherein the IR waveband receiver further comprises:
a tertiary reflector to reflect the IR wavebands passed by the laser waveband dichroic beam splitter; and
a quaternary reflector to receive the IR wavebands reflected by the tertiary reflector and to focus the IR wavebands onto the FPAs of the IR waveband FPA assembly,
wherein the quaternary reflector includes an aperture to allow passage of the IR wavebands, the aperture being at or near a focus image plane of the secondary reflector, and
wherein the primary reflector has a concave reflective surface, the secondary reflector has a convex reflective surface, the tertiary reflector has a flat reflective surface, and the quaternary reflector has a concave reflective surface.

10. The sensor system of claim 7 wherein the laser waveband dichroic beam splitter and the one or more IR waveband focal plane arrays are cooled to a cryogenic temperature,
wherein the multi-waveband sensor system further comprises LADAR transmit beam steering control circuitry configured to:
detect a target within the one or more IR waveband FPAs; and
control the LADAR beam steering mirror to steer the LADAR pulses at the detected target, the LADAR pulses being reflected by the laser waveband dichroic beam splitter to the secondary reflector, and being further reflected by the secondary reflector to the off-axis region on the primary reflector for subsequent reflection in a direction of the detected target.

11. The sensor system of claim 3 wherein the primary reflector is further configured to gather visible wavebands, and
wherein the sensor system further comprises a visible waveband receiver comprising:
a visible waveband FPA; and
a visible waveband dichroic beam splitter to reflect visible wavebands gathered by the primary reflector and reflected by the secondary reflector to the visible waveband FPA.

12. The sensor system of claim 11 wherein the laser waveband dichroic beam splitter further reflects the visible wavebands,
wherein the visible waveband dichroic beam splitter is positioned within a path of the wavebands reflected by the laser waveband dichroic beam splitter, the visible band dichroic beam splitter configured to pass the laser wavebands to the LADAR beam steering mirror and to reflect the visible wavebands to the visible waveband FPA.

13. The sensor system of claim 11 wherein the laser waveband dichroic beam splitter further passes visible wavebands,
wherein the visible band dichroic beam splitter is positioned within the focal path of the secondary reflector and configured to reflect the visible wavebands to the visible waveband FPA that were passed by the laser waveband dichroic beam splitter, and
wherein the visible band dichroic beam splitter passes the IR wavebands to the IR waveband receiver.

14. An optical seeker comprising:
a secondary reflector positioned within a gathering path of a primary reflector to reflect the wavebands gathered by the primary reflector back through an aperture in the primary reflector;
a LADAR subsystem to transmit LADAR pulses for reflection to an off-axis region on the primary reflector for direction toward a target and to process LADAR returns;
an infrared (IR) waveband receiver including a pair of two-waveband focal plane arrays (FPAs) to receive IR wavebands gathered by the primary reflector; and
control circuitry configured to detect a target within the IR waveband FPAs to control the direction of transmission of the LADAR pulses,
wherein laser wavebands reflected from the target are gathered by the primary reflector and separated from the IR wavebands by a laser waveband dichroic beam splitter configured to pass infrared (IR) wavebands and to reflect laser wavebands,
wherein the laser waveband dichroic beam splitter is positioned within a focal path of the secondary reflector to:
pass the IR wavebands reflected by the secondary reflector through to an IR waveband receiver;
reflect the LADAR pulses through the aperture to the secondary reflector for reflection to an off-axis region on the primary reflector for direction toward a target; and
reflect the LADAR returns to the LADAR subsystem that are gathered by the primary reflector and reflected by the secondary reflector through the aperture.

15. The optical seeker of claim 14
wherein the off-axis region on the primary reflector is devoid of strut obscurations and obscuration by the secondary reflector.

16. The optical seeker of claim 15 wherein the LADAR subsystem further comprises a LADAR beam steering mirror to reflect the LADAR pulses to the laser waveband dichroic beam splitter for direction to the target,
wherein the pair of two-waveband focal plane arrays (FPAs) comprises a first IR FPA configured to separately detect long-wave IR (LWIR) wavebands and very long-wave IR (VLWIR) wavebands, and a second IR FPA configured to separately detect medium-wavelength IR (MWIR) wavebands and LWIR wavebands, and wherein the IR waveband receiver further comprises a FPA assembly dichroic beam splitter to receive the IR wavebands passed by the laser waveband dichroic beam splitter, the FPA assembly dichroic beam splitter to pass the longer-wave IR wavebands to the first IR FPA and to reflect the shorter-wave IR wavebands to the second IR FPA.

17. The optical seeker of claim 16 wherein the LWIR wavebands separately detectable by the first IR FPA have wavelengths ranging from approximately 8 to 10 microns,
wherein the LWIR wavebands separately detectable by the second IR FPA have wavelengths ranging from approximately 6.4-6.8 microns within an atmospheric $H_2O$ absorption band to allow target hardbody temperature detection with reduced Earth background clutter effects,
wherein the VLWIR wavebands separately detectable by the first IR FPA have wavelengths of twelve or more microns, and
wherein the MWIR wavebands separately detectable by the second IR FPA have wavelengths ranging from approximately 4.2 to 4.4 microns within an atmospheric $CO_2$ absorption band to allow target plume detection with reduced Earth background clutter effects.

18. The optical seeker of claim 16 wherein the laser waveband dichroic beam splitter and the IR waveband focal plane arrays are cooled to a cryogenic temperature.

19. The optical seeker of claim 16 wherein the control circuitry is configured to:
detect a target within the one or more IR waveband FPAs; and
control the LADAR beam steering mirror to steer the LADAR pulses at the detected target, the LADAR pulses being reflected by the laser waveband dichroic beam splitter to the secondary reflector, and being further reflected by the secondary reflector to the off-axis region on the primary reflector for subsequent reflection in a direction of the detected target.

20. The optical seeker of claim 19 wherein the IR waveband receiver further comprises:
a tertiary reflector to reflect the IR wavebands passed by the laser waveband dichroic beam splitter; and
a quaternary reflector to receive the IR wavebands reflected by the tertiary reflector and to focus the IR wavebands onto the FPAs of the IR waveband FPA assembly,
wherein the quaternary reflector includes an aperture to allow passage of the IR wavebands, the aperture being at or near a focus image plane of the secondary reflector, and
wherein the primary reflector has a concave reflective surface, the secondary reflector has a convex reflective surface, the tertiary reflector has a flat reflective surface, and the quaternary reflector has a concave reflective surface.

21. A method for sensing multiple wavebands comprising:
reflecting wavebands by a secondary reflector, including laser and infrared (IR) wavebands, that were gathered by a primary reflector back through an aperture in the primary reflector;
transmitting LADAR pulses by an off-axis region on the primary reflector for direction toward a target; and
providing the laser waveband dichroic beam splitter within a focal path of the secondary reflector to:
pass the IR wavebands reflected by the secondary reflector through to an IR waveband receiver;
reflect the LADAR pulses through the aperture to the secondary reflector for reflection to an off-axis region on the primary reflector for direction toward a target; and
reflect the LADAR returns to a LADAR subsystem for processing, the LADAR returns having been gathered by the primary reflector and reflected by the secondary reflector through the aperture.

22. The method of claim 21 wherein the laser waveband dichroic beam splitter is positioned within the focal path of the secondary reflector behind the aperture, and
wherein the off-axis region on the primary reflector is devoid of strut obscurations and obscuration by the secondary reflector,
wherein the method further comprises:
reflecting the LADAR pulses with a LADAR beam steering mirror to the laser waveband dichroic beam splitter for direction to the target; and
processing IR wavebands passed by the laser waveband dichroic beam splitter using a pair of two-waveband focal plane arrays (FPAs).

* * * * *